(12) United States Patent
Sato et al.

(10) Patent No.: US 8,417,494 B2
(45) Date of Patent: Apr. 9, 2013

(54) SIMULATION METHOD FOR EVALUATING GOLF BALLS

(75) Inventors: Katsunori Sato, Saitamaken (JP); Takuma Nakagawa, Saitamaken (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 345 days.

(21) Appl. No.: 12/881,387

(22) Filed: Sep. 14, 2010

(65) Prior Publication Data
US 2012/0065949 A1 Mar. 15, 2012

(51) Int. Cl.
*G06G 7/48* (2006.01)

(52) U.S. Cl.
USPC .................................. 703/6; 703/1; 434/252

(58) Field of Classification Search .................. 703/6
See application file for complete search history.

(56) References Cited

U.S. PATENT DOCUMENTS

| 6,285,445 | B1 * | 9/2001 | Winfield et al. ................ 356/28 |
| 7,076,414 | B2 | 7/2006 | Miyori |
| 7,130,782 | B2 | 10/2006 | Miyori et al. |
| 7,435,089 | B2 | 10/2008 | Sato et al. |

FOREIGN PATENT DOCUMENTS

| JP | 2002-250739 A1 | 9/2002 |
| JP | 2002-340735 A | 11/2002 |
| JP | 2002-358473 A | 12/2002 |
| JP | 2005-34378 A | 2/2005 |
| JP | 2006-275722 A1 | 10/2006 |

OTHER PUBLICATIONS

Penner, "The physics of Golf", Institute of Physics Publishing, Reports on Progress in Physics, 66, pp. 131-171, 2003.*
Alam et al, "Aerodynamics of an Australian Rules Foot Ball and Rugby Ball", Computational Fluid Dynamics for Sport Simulation, Lecture Notes in Computational Science and Engineering 72, 2009, M. Peters (ed.).*

* cited by examiner

*Primary Examiner* — Mary C Jacob
(74) *Attorney, Agent, or Firm* — Sughrue Mion, PLLC (57) ABSTRACT

When an air stream is made to flow into a virtual airflow space set up by computer and the velocity, direction and pressure of the air stream flowing around a rotating golf ball model are calculated for each cell of a grid, by setting an airflow stabilization time during which computation proceeds without rotation of the golf ball model until the air stream that flows into the virtual airflow space ceases to be influenced by the initial air stream and stabilizes, then rotating the golf ball model at a given spin rate once the airflow stabilization time has elapsed and calculating the velocity, direction and pressure of the air stream for each grid cell, the computational time can be greatly shortened without lowering accuracy, enabling coefficients of lift and coefficients of drag to be easily calculated from the velocity, direction and pressure of the air stream for each grid cell.

8 Claims, 5 Drawing Sheets
(4 of 5 Drawing Sheet(s) Filed in Color)

SIMULATION METHOD FOR EVALUATING GOLF BALLS

BACKGROUND OF THE INVENTION

The present invention relates to a simulation method which analyzes air flow around a golf ball having on a surface thereof at least one depression or protrusion when the golf ball rotates while in flight. More specifically, the invention relates to a simulation method for evaluating golf ball performance, which method sets up a golf ball model and air flow on a computer, employs arithmetic operations executed by the computer to analyze air flow around the golf ball, and calculates a lift coefficient and a drag coefficient for the golf ball.

It is known that when a physical body such as a golf ball flies through the atmosphere, airflow turbulence arises around the body. If the surface of the body has a complex shape or the body rotates while in flight, the airflow turbulence during flight is complex and exerts a major influence on the flight performance of the body, such as the flight distance.

Golf balls are usually provided with a large number of dimples of circular shape, as seen in a plan view. Because the combination of dimple parameters such as three-dimensional shape, arrangement and size has a major influence on the aerodynamic properties of the golf ball, it is necessary to understand the causal relationship between these dimple parameters and the aerodynamic properties.

Generally, when investigating the effects that changes in dimple parameters such as shape, construction and arrangement have on the flight performance of a golf ball, it has commonly been the practice to fabricate a variety of molds for molding golf balls and test-produce various golf balls. The balls are then subjected to ball striking tests and properties such as the initial velocity, spin rate and trajectory (flight distance, height) are measured, from which the aerodynamic properties are evaluated.

However, such experimental evaluation based on actual physical prototypes is time-consuming and costly, and moreover cannot clearly establish causal relationships between the shapes and arrangement of the dimples and the aerodynamic properties of the ball. For this reason, golf balls which have been newly designed based on evaluation results obtained by experimentation often fail to achieve the intended performance. In such cases, it is necessary each time to design and produce a new ball prototype and determine its aerodynamic properties, generating a further outlay of time and expense, and thus making efficient golf ball development impossible.

To address this problem, the inventors earlier proposed a simulation method which sets up, in a computer, a golf ball model and a virtual airflow space surrounding the periphery of the golf ball model, establishes a state where an air stream flows into the virtual airflow space, calculates the coefficient of lift and the coefficient of drag for the golf ball and, based on these calculated values, estimates the trajectory of the golf ball when it is hit (JP-A 2006-275722; U.S. Pat. No. 7,435,089).

However, evaluating the performance of a golf ball by this simulation method takes a very long time, and actual evaluation is not always feasible. That is, in this simulation method, to calculate the coefficient of lift and the coefficient of drag, a grid is generated within the virtual airflow space, the grid being set up so as to be finer near the surface of the golf ball model and to become larger at an increasing distance from the surface. The velocity, direction and pressure of the air stream are calculated for each cell of the grid and integrated, thereby calculating the coefficient of lift and the coefficient of drag. However, calculating the coefficients of lift and drag takes a long time and, because the trajectory of the ball is estimated by repeating these calculations as the ball moves, simulating the trajectory in this way ends up taking an inordinate amount of time.

Prior-art literature other than that mentioned above (JP-A 2006-275722, U.S. Pat. No. 7,435,089) relevant to the present invention is shown below.
JP-A 2002-358473
JP-A 2005-034378
JP-A 2002-340735
JP-A 2002-250739

SUMMARY OF THE INVENTION

It is therefore an object of the present invention to provide a simulation method for evaluating golf balls, which method, when setting up in a computer a golf ball model and a virtual airflow space surrounding the periphery of the golf ball model, establishing a state where an air stream flows into the virtual airflow space, and calculating the coefficient of lift and the coefficient of drag for the golf ball, enhances simplicity without lowering accuracy and is able to effectively shorten the computational time.

Accordingly, the invention provides the simulation methods for golf ball evaluation of [1] to [8] below.

[1] A simulation method for evaluating the performance of a golf ball having on a surface thereof at least one depression or protrusion by analyzing air flow around the ball when the ball rotates while in flight, the method comprising the steps of:

(A) setting up, within a virtual space created in a computer, a golf ball model and a virtual airflow space which surrounds a periphery of the golf ball model;

(B) generating a grid in the virtual airflow space and configuring the grid so as to be finer near a surface of the golf ball model and to gradually increase in size in a direction leading away from the surface;

(C) establishing a state where an air stream of a given velocity flows into the virtual airflow space from in front of the golf ball model;

(D) setting an airflow stabilization time during which computation proceeds until the air stream flowing into the virtual airflow space ceases to be affected by initial air flow and stabilizes;

(E) rotating the golf ball model at a given spin rate once the airflow stabilization time has elapsed;

(F) calculating for each cell of the grid a velocity, a direction and a pressure of the air stream which flows within the virtual space from in front of the golf ball model, passes around the ball model and flows on behind while the model rotates through at least one-half turn after the airflow stabilization time has elapsed; and (G) integrating the air stream velocity, direction and pressure calculated for each individual grid cell, and calculating a coefficient of lift and a coefficient of drag for the golf ball model in the virtual airflow space.

[2] The simulation method for golf ball evaluation of [1], wherein the airflow stabilization time is set in such a way as to satisfy the expression $$1 \leq (V \times T)/X \leq 20$$

(where V is the air stream velocity (m/s), T is the airflow stabilization time (s), and X is the length (m) of the virtual airflow space in the direction of flow by the air stream).

[3] The simulation method for golf ball evaluation of [1], wherein the grid generated in the virtual airflow space is in the form of a tetra mesh.

[4] The simulation method for golf ball evaluation of [1], wherein the grid generated in the virtual airflow space is in the form of a polygon mesh.

[5] A simulation method for golf ball evaluation, comprising the step of, based on the results of simulation in [1], visualizing the direction and velocity of air flow around the golf ball model using vector directions and lengths.

[6] A simulation method for golf ball evaluation, comprising the step of, based on the results of simulation in [1], visualizing the distribution of air pressure around the golf ball model using isobaric lines or isobaric surfaces.

[7] A simulation method for golf ball evaluation, comprising the step of, based on the results of simulation in [1], visualizing the vorticity distribution of air around the golf ball model using vorticity contours or isosurfaces.

[8] A simulation method for golf ball evaluation, comprising the step of, based on the results of simulation in [1], visualizing air around the golf ball model using stream lines, path lines, particle traces or volume rendering of the air.

In this simulation method for evaluating golf balls, when a stream of air is made to flow into a virtual airflow space and the velocity, direction and pressure of the air stream flowing around a rotating golf ball model are calculated for each cell of a grid, by (D) "setting an airflow stabilization time during which computation proceeds until the air stream flowing into the virtual airflow space ceases to be affected by initial air flow and stabilizes," then (E) "rotating the golf ball model at a given spin rate once the airflow stabilization time has elapsed" and calculating the velocity, direction and pressure of the air stream for each grid cell, the computational time can be greatly shortened without lowering the accuracy, enabling the coefficient of lift and the coefficient of drag to be easily calculated from the velocity, direction and pressure of the air stream for each grid cell.

Figure 1A:
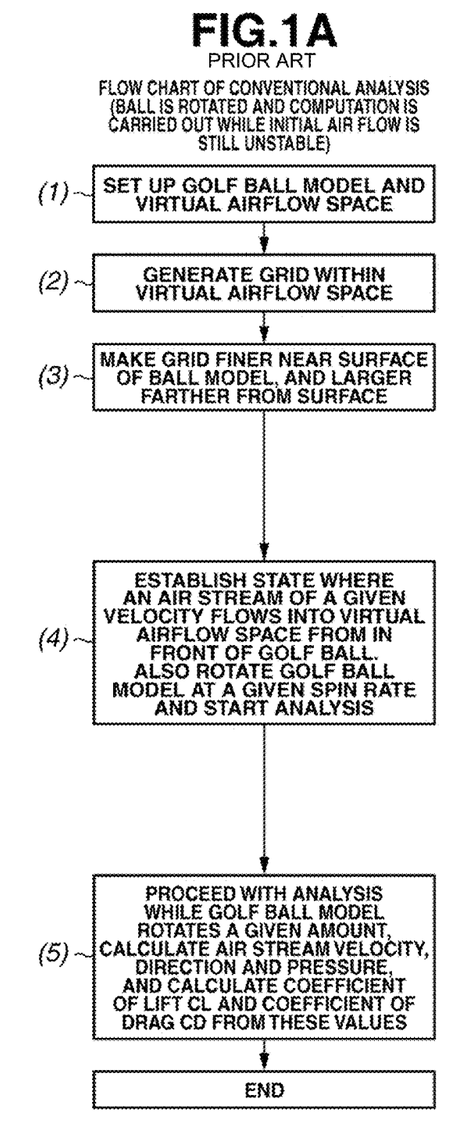
FIG. 1 is a flow chart showing analytical techniques for evaluating the performance of a golf ball by analyzing the air stream around the golf ball, (A) being a conventional analytical technique and (B) being the analytical technique of the present invention.
Figure 1B:
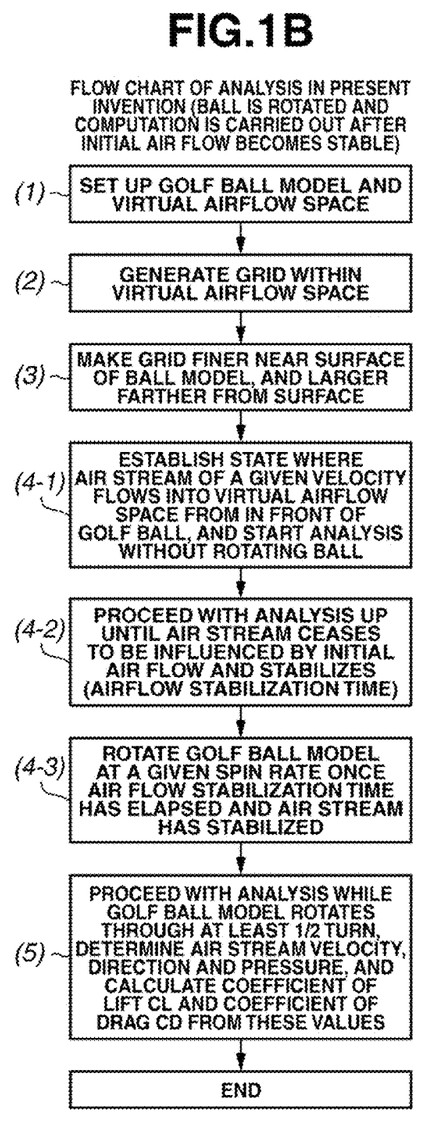

As shown in the flow chart in FIG. 1A, conventional methods entail (1) setting up, within a virtual space, a golf ball model and a virtual airflow space; (2) generating a grid in the virtual airflow space; (3) making the grid finer near the surface of the ball model and making the grid larger at an increasing distance from the surface; in this state, (4) establishing a state where an air stream of a given velocity flows into the virtual airflow space from in front of the golf ball, and also rotating the golf ball model at a given spin rate and starting analysis; and (5) proceeding with analysis while the golf ball model rotates a given amount, calculating the air stream velocity, direction and pressure, and calculating from these the coefficient of lift and the coefficient of drag. By contrast, as shown in FIG. 1B, the present invention entails (1) carrying out set up according to a sequence similar to that in (1) to (3) of conventional methods; then (4-1) establishing a state where an air stream of a given velocity flows into the virtual airflow space from in front of the golf ball, and starting analysis without rotating the ball; (4-2) proceeding with analysis up until the air stream ceases to be influenced by initial air flow and stabilizes (airflow stabilization time); (4-3) rotating the golf ball model at a given spin rate once the airflow stabilization time has elapsed and the air stream has stabilized; and (5) proceeding with analysis while the golf ball model rotates through at least one-half turn, determining the velocity, direction and pressure of the airstream, and calculating from these the coefficient of lift and the coefficient of drag. That is, in the prior art, the ball is rotated and computation is carried out while initial air flow is still unstable, whereas in the present invention, the ball is rotated and computation is carried out after initial air flow has become stable.

Moreover, in the simulation method of the present invention, when an air stream is made to flow into a virtual airflow space that has been set up and the state of air flow around the golf ball model within the virtual airflow space is analyzed, during an unstable initial air flow state in which the air stream that has entered the virtual airflow space strikes the ball and flows toward the back of the ball while parameters such as the direction, pressure and velocity of the air stream change irregularly, analysis proceeds without rotation of the ball. After the influence of this initial air flow ceases and air flow has stabilized (after the airflow stabilization time has elapsed), the golf ball model is rotated at a given spin rate, analysis proceeds while the ball model rotates through a given number of turns which is at least one-half turn, and the velocity, direction and pressure of the air stream are calculated. By then calculating the coefficient of lift and the coefficient of drag from these values, unstable airflow data due to the influence of initial air flow can be excluded, allowing the coefficients of lift and drag to be calculated from stable airflow data alone, and thus enabling accurate analytical results to be obtained in a short period of time.

BRIEF DESCRIPTION OF THE DIAGRAMS

The patent or application file contains at least one drawing executed in color. Copies of this patent or patent application publication with color drawing(s) will be provided by the Office upon request and payment of the necessary fee.

DETAILED DESCRIPTION OF THE INVENTION

The invention is described more fully below in conjunction with the diagrams.

The simulation method of the invention employs arithmetic operations executed by a computer to analyze air flow around a golf ball having on the surface thereof at least one depression or protrusion when the golf ball rotates while in flight, and calculate the coefficient of lift and the coefficient of drag for the ball.

In the simulation method of the invention, first, (A) a golf ball model and a virtual airflow space which surrounds the periphery of the golf ball model are set up within a virtual space created in a computer ((1) in the flow chart in FIG. 1B).

Figure 2A:
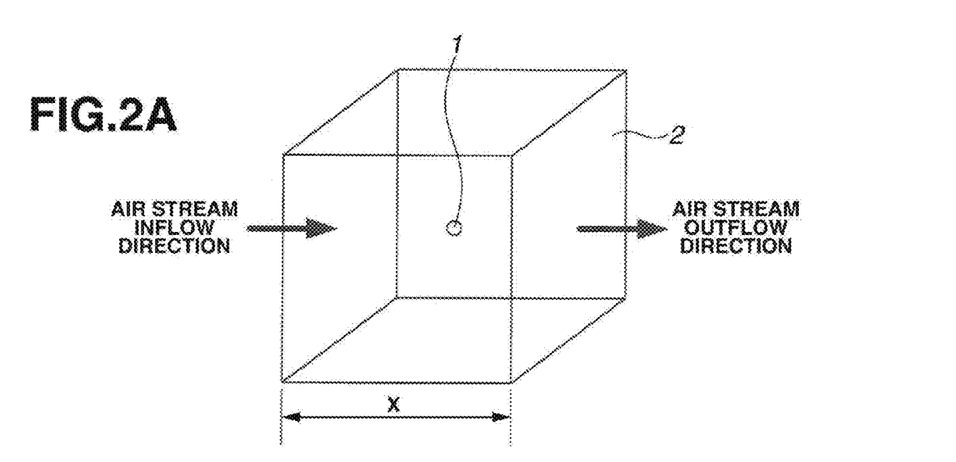
FIG. 2 presents diagrams illustrating the golf ball model and the virtual airflow space in the simulation method of the invention, (A) being a schematic view showing an example of a state where a golf ball model and a virtual airflow space have been set up within a virtual space, (B) being a cross-sectional view passing through the center of the golf ball model in (A), and (C) being an enlarged schematic view of the surface and surface vicinity of the golf ball model in (B).
Figure 2B:
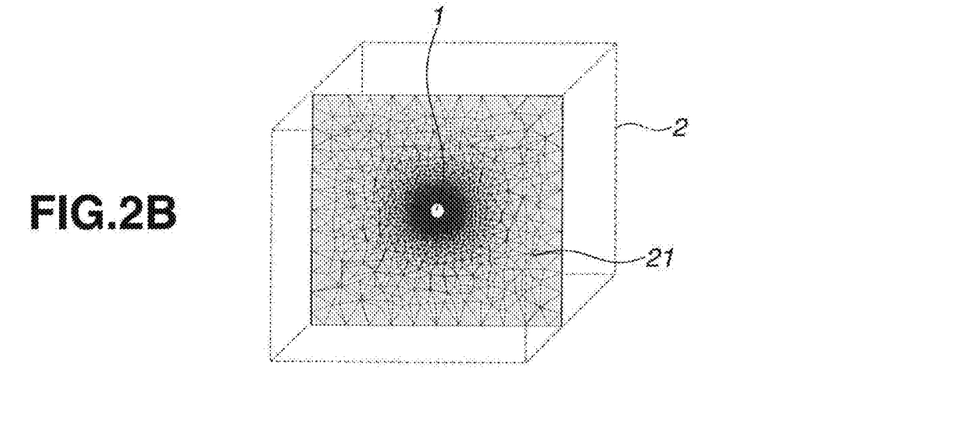
Figure 2C:
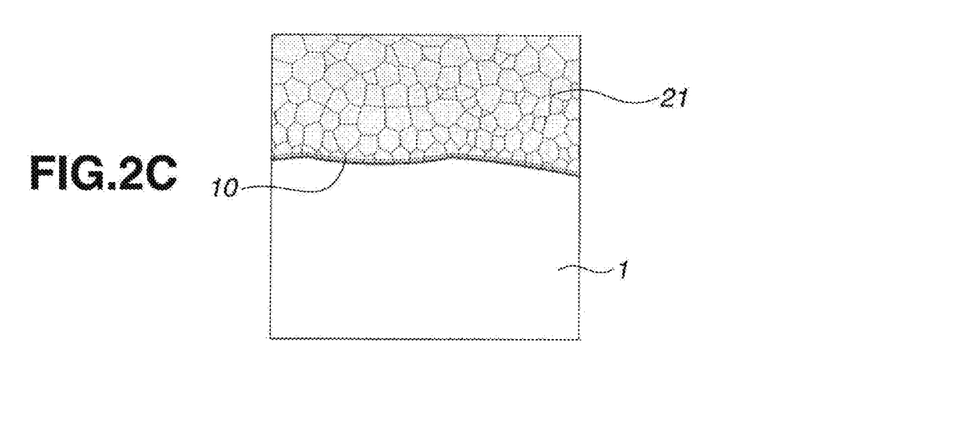

FIGS. 2A, B and C show an example of this step of setting up a golf ball model and a virtual airflow space by computer.

FIG. 2A is a schematic perspective view showing an example of a state where a golf ball model and a virtual airflow space have been set up within a virtual space; FIG. 2B is a cross-sectional view passing through the center of the golf ball model 1 in FIG. 2A, this being a schematic view showing an example of the subsequently described grid cells; and FIG. 2C is an enlarged schematic view showing an example of grid cells at and near the surface of the golf ball model 1 in FIG. 2B.

In this invention, as noted above and shown in FIG. 2A, for example, a golf ball model 1 and a virtual airflow space 2 surrounding the periphery of the ball model 1 are set up within a virtual space. This golf ball model 1 may be created by 3D CAD, for example. The virtual airflow space 2 may be given a rectangular parallelepiped shape, most preferably a cubical shape, of a given size, with the golf ball model 1 at the center. By way of illustration, the virtual airflow space 2 may be made a cube having a size of from 3 m×3 m×3 m to 15 m×15 m×15 m. In addition, the length X of this virtual airflow space 2 in the direction of flow by the air stream, although not subject to any particular limitation, is preferably set to from 3 to 15 m. Although it is necessary for this virtual airflow space 2 to be of such an extent as to substantially encompass all air flow around the golf ball affecting movement by the golf ball, because air flow at a distance from the golf ball has only a small influence on golf ball movement and because the simulation precision decreases when the size of the virtual airflow space is too small, from the standpoint of the efficiency or precision of simulation, it is preferable for the size of the virtual airflow space 3 to be in the above-indicated range.

Next, (B) a grid is generated in the virtual airflow space, and the grid is set up so as to be finer near a surface of the golf ball model and to gradually increase in size in a direction leading away from the surface ((2) and (3) in the flow chart in FIG. 1B).

Figure 3A:
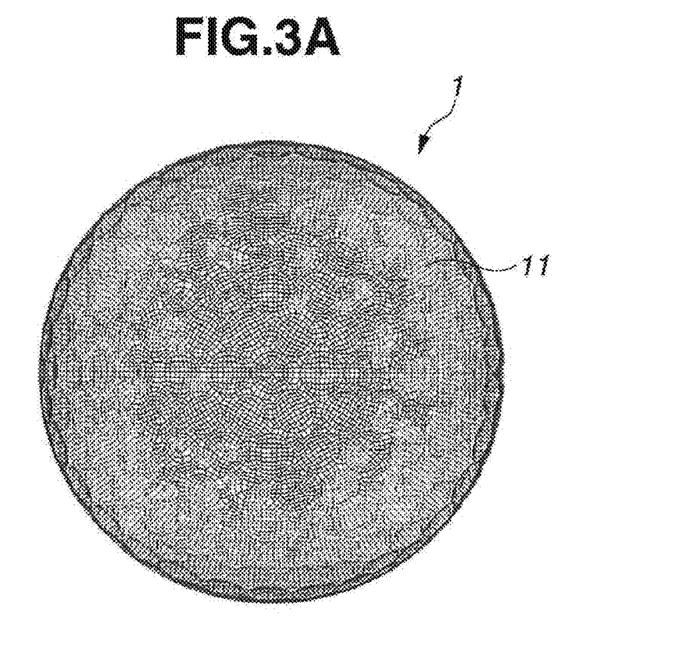
FIG. 3 shows an example of a golf ball model in the invention, (A) being a planar view showing face cells formed on the surface, and (B) being a three-dimensional view showing dimples formed on the surface.
Figure 3B:
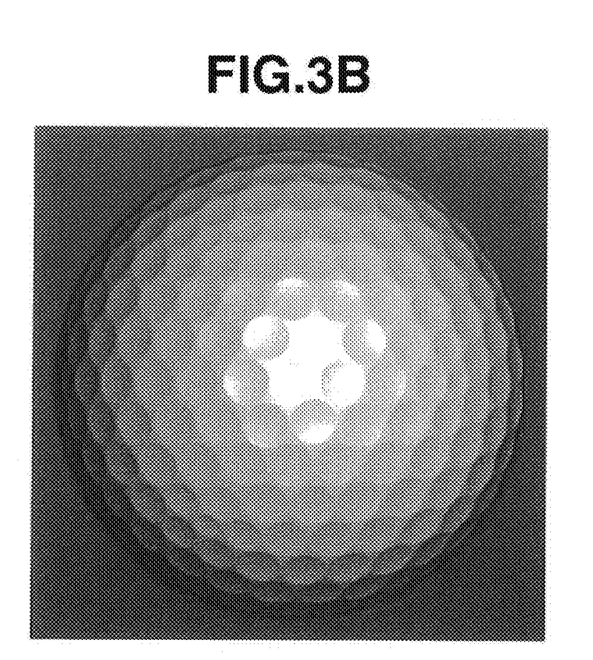

Specifically, first, as shown in FIG. 3A, the surface of the golf ball model 1 is divided into cells measuring, for example, about 0.002 mm on a side, thereby setting up a large number of polygonal (e.g., triangular, quadrangular) or substantially polygonal (e.g., substantially triangular, substantially quadrangular) face cells 11. In addition, as shown in FIG. 2C, grid cells 21 adjoining the golf ball model surface 10 which is entirely covered by these individual face cells are set up. The grid cells 21 adjoining the surface of the golf ball model 1 are set up in a substantially polygonal prismatic shape such as a substantially quadrangular prismatic shape, or in a substantially polygonal pyramidal shape. Also, from the grid cells adjoining the golf ball model surface 10, the remainder of the virtual airflow space 2 is divided grid-like into cells in such a way that the volume of the grid cells 21 gradually increases in directions leading away from the golf ball model 1. In this way, the entire virtual airflow space 2 is divided into grid cells 21.

The grid cells formed in the virtual airflow space 2 may be given a suitable shape, such as a polygon mesh (polyhedrons), a tetra mesh (tetrahedrons), a prism mesh (triangular prisms), a hexa mesh (hexahedrons), or any shape that is a mixture thereof. Of the above, the use of a polygon mesh shape or a tetra mesh shape is especially preferred.

Because the air flow around a golf ball has a greater influence when close to the golf ball, as shown in FIG. 2B and explained above, the grid cells are set up in such a way as to be finer near the golf ball model 1 and to be coarser away from the golf ball model 1 where the influence exerted by the air flow is small. The increase in the volume of the grid cells in directions leading away from the ball surface of the golf ball model 1 may be continuous or stepwise.

Next, (C) a state wherein an air stream of a given velocity flows into the virtual airflow space 2 from in front of the golf ball model 1 is established ((4-1) in the flow chart in FIG. 1B), (D) an airflow stabilization time during which computation proceeds until the air stream that flows into the virtual airflow space 2 ceases to be influenced by initial air flow and stabilizes is set up ((4-2) in the flow chart in FIG. 1B), and (E) the golf ball model 1 is rotated at a given spin rate once the airflow stabilization time has elapsed ((4-3) in the flow chart in FIG. 1B).

The velocity of the air stream is not subject to any particular limitation and may be suitably set in accordance with, for example, the anticipated velocity of flight by the golf ball. Generally, the air stream velocity may be set to any velocity within a range of from 5 to 90 m/s.

The airflow stabilization time is preferably the period of time until the unstable state of initial air flow vanishes and the interior of the virtual airflow space 3 becomes filled with a stable air stream, and is suitably set in accordance with the velocity V of the air stream and the length X of the virtual airflow space 2 in the direction of flow by the air stream (see FIG. 2A). Specifically, the airflow stabilization time may be set in such a way that the air stream velocity V (m/s), the airflow stabilization time T (s), and the length X (m) of the virtual airflow space 2 in the direction of flow by the air stream satisfy the expression $1 \leq (V \times T)/X \leq 20$. That is, the airflow stabilization time may be suitably set within a range of from the period of time between initial inflow of the air stream until the air stream reaches the downstream side of the virtual airflow space 2 to a period of time that is 20 times as long, and is more preferably set in a range of $1 \leq (V \times T)/X \leq 8$.

After the above airflow stabilization time T has elapsed, the golf ball model 1 is rotated. The rate of rotation, or spin rate, is suitably selected, without particular limitation, according to the spin rate during flight that is anticipated from such factors as the number and head speed of the club, although it is generally preferable to set the spin rate to a value not greater than 15,000 rpm.

Next, (F) the velocity, direction and pressure of the air stream which flows from in front of the golf ball model, passes around the ball model and flows on behind the model is calculated for each cell of the grid while the golf ball model rotates through at least one-half turn after the airflow stabilization time has elapsed (first stage of (5) in the flow chart in FIG. 1B).

That is, the elements of motion that arise when an air stream flows into the virtual airflow space 2 and comes into contact with the golf ball model 1 are the velocity of the air stream in each axial direction in a three-dimensional spatial coordinate system, the direction of the air stream, and the pressure of the air stream against the surface of the ball model 1. These elements of motion can be calculated by substituting numerical values into the basic equations used for computation; namely, the equations of continuity (1) to (3) below corresponding to the law of conservation of mass, and the Navier-Stokes equations (4) to (6) below corresponding to the law of conservation of momentum by a physical body.

$$\frac{\partial \rho}{\partial t} + \frac{\partial (\rho u)}{\partial x} + \frac{\partial (\rho v)}{\partial y} + \frac{\partial (\rho w)}{\partial z} = 0 \qquad (1)$$

-continued $$divV = \frac{\partial(\rho u)}{\partial x} + \frac{\partial(\rho v)}{\partial y} + \frac{\partial(\rho w)}{\partial z} \quad (2)$$

where u, v and w are the velocities in the x, y and z directions, respectively.
Using the divergence operator, $$\frac{\partial \rho}{\partial t} + div(\rho V) = 0. \quad (3)$$

Letting F be the mass force, $$\frac{Du}{Dt} = F_x - \frac{1}{\rho}\frac{\partial p}{\partial x} + \frac{\mu}{\rho}\left(\frac{\partial^2 u}{\partial x^2} + \frac{\partial^2 u}{\partial y^2} + \frac{\partial^2 u}{\partial z^2}\right) + \frac{1}{3}\frac{\mu}{\rho}\frac{\partial}{\partial x}\left(\frac{\partial u}{\partial x} + \frac{\partial v}{\partial y} + \frac{\partial w}{\partial z}\right) \quad (4)$$

$$\frac{Dv}{Dt} = F_y - \frac{1}{\rho}\frac{\partial p}{\partial y} + \frac{\mu}{\rho}\left(\frac{\partial^2 v}{\partial x^2} + \frac{\partial^2 v}{\partial y^2} + \frac{\partial^2 v}{\partial z^2}\right) + \frac{1}{3}\frac{\mu}{\rho}\frac{\partial}{\partial y}\left(\frac{\partial u}{\partial x} + \frac{\partial v}{\partial y} + \frac{\partial w}{\partial z}\right) \quad (5)$$

$$\frac{Dw}{Dt} = \quad (6)$$

$$F_z - \frac{1}{\rho}\frac{\partial p}{\partial z} + \frac{\mu}{\rho}\left(\frac{\partial^2 w}{\partial x^2} + \frac{\partial^2 w}{\partial y^2} + \frac{\partial^2 w}{\partial z^2}\right) + \frac{1}{3}\frac{\mu}{\rho}\frac{\partial}{\partial z}\left(\frac{\partial u}{\partial x} + \frac{\partial v}{\partial y} + \frac{\partial w}{\partial z}\right)$$

where $\rho$ is the air density, p is the air pressure, and $\mu$ is the air viscosity.

In a simulation where air flows around the above golf ball model 1 in, as shown in FIG. 2A, the direction of the arrows, the flow of air in each of the grid cells in the virtual airflow space 2 may be analyzed by arithmetic operations. Using the above equations (1) to (6) for the arithmetic operations, equations (1) to (6) can be discretized according to the division of the virtual airflow space 2 into grid cells, and the operations carried out. The method of simulation to be used may be suitably selected from among, for example, finite difference calculus, finite volume methods, boundary element methods and finite element methods while taking parameters such as the simulation conditions into account.

In the present invention, as noted above, it is critical here for the velocity, direction and pressure of the air stream in each cell of the grid to be calculated during at least one-half turn of the golf ball model. If the number of turns through which the golf ball model 1 rotates within the period of analysis is less than one-half turn, an accurate air stream velocity, direction and pressure may not be obtained. On the other hand, if the number of turns made by the ball model 1 during the period of analysis is high, this enables the accuracy to be correspondingly improved but has the drawback of increasing the computational time and may thus make it impossible, depending on the performance of the computer, to achieve a sufficient reduction in time. For this reason, the number of turns by the golf ball model 1 during the period of analysis, while not subject to any particular limitation provided it is at least one-half, is preferably from one-half turn to ten turns, and more preferably from one-half turn to seven turns.

Next, (G) the air stream velocity, direction and pressure calculated for each individual grid cell within the virtual airflow space 2 are integrated, and the coefficient of lift and the coefficient of drag for the golf ball model in the virtual airflow space are calculated (second stage of (5) in the flow chart in FIG. 1B).

Figure 4:
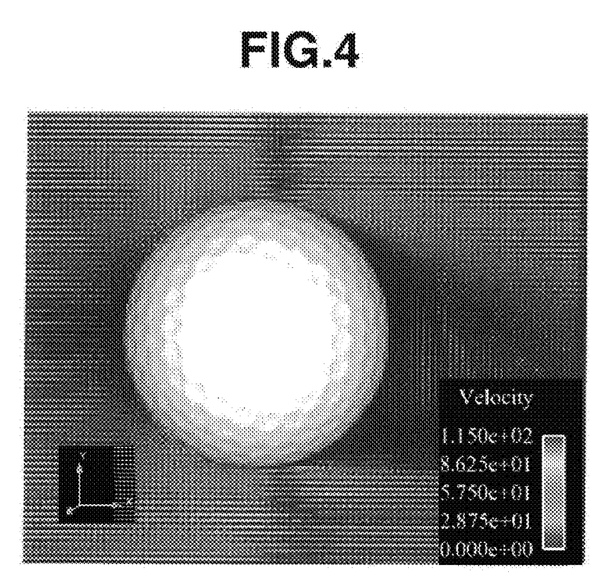
FIG. 4 is a diagram which uses vector directions and lengths to represent the direction and velocity of air flow around a golf ball model.
Figure 5:
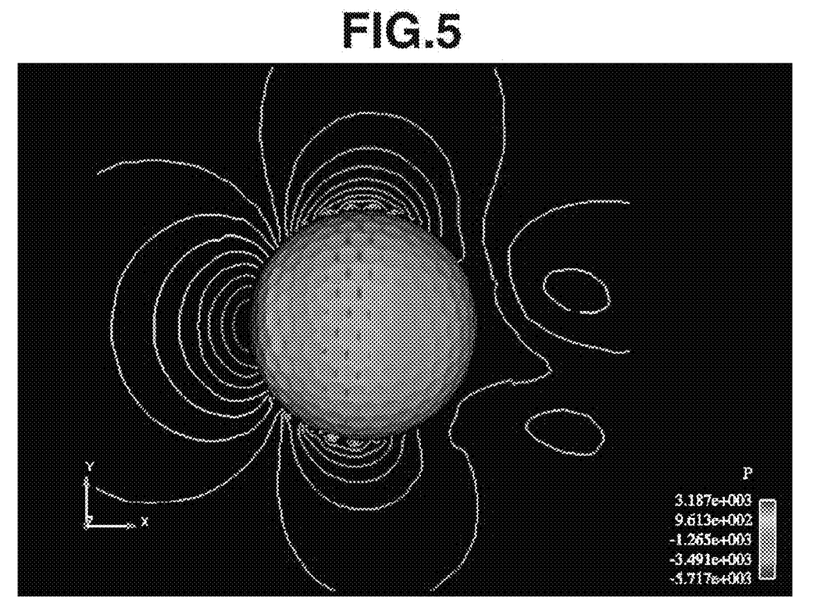
FIG. 5 is a diagram which uses isobaric lines to represent the pressure distribution of air around a golf ball model.
Figure 6:
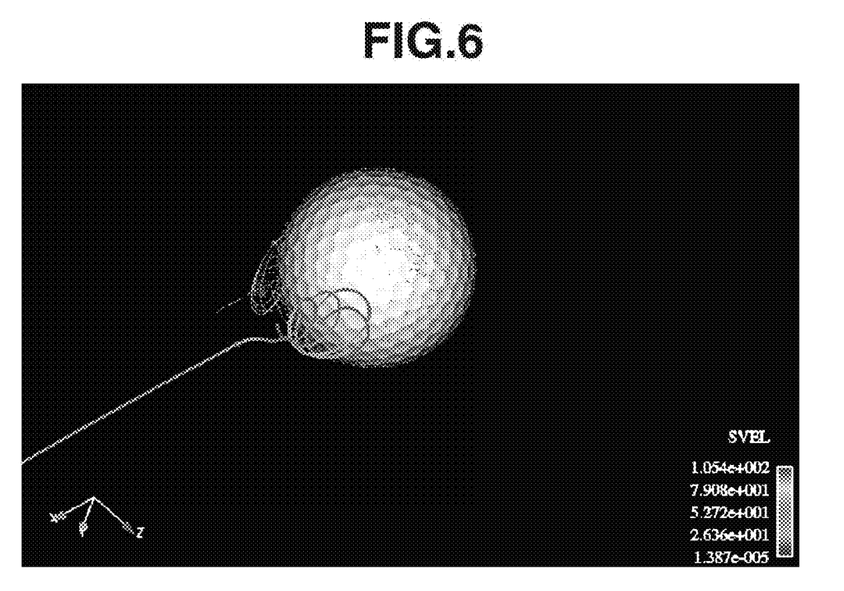
FIG. 6 is a diagram which uses vorticity contours to represent the vorticity distribution of air around a golf ball model.
Figure 7:
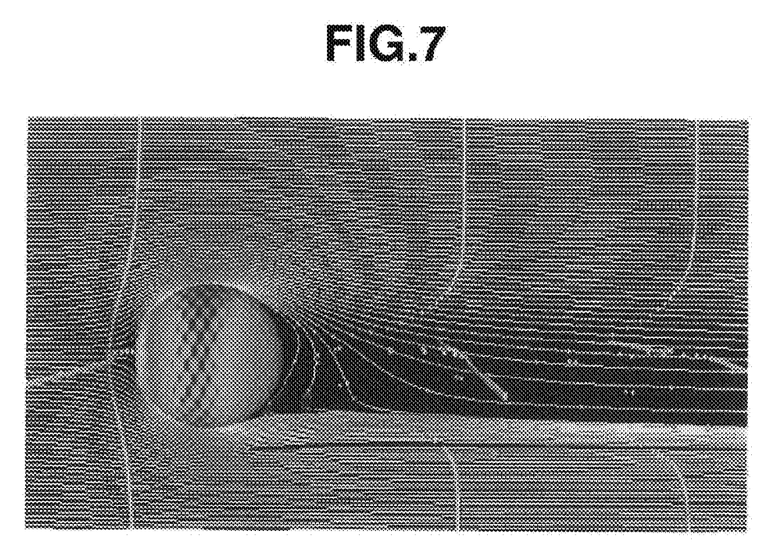
FIG. 7 is a diagram showing air stream lines around a golf ball model.

Moreover, in the invention, the coefficient of lift and the coefficient of drag are calculated by the above-described simulation method and, based on these results, the flow state, pressure, vorticity and other properties of air around the golf ball model 1 can be visualized as indicated below in (1) to (4):

(1) by visualizing, as shown in FIG. 4, the direction and velocity of air flow around the golf ball model 1 using vector directions and lengths;

(2) by visualizing, as shown in FIG. 5, the distribution of air pressure around the golf ball model 1 using isobaric lines or isobaric surfaces;

(3) by visualizing, as shown in FIG. 6, the distribution of air vorticity around the golf ball model 1 using vorticity contours or isosurfaces;

(4) by visualizing, as shown in FIG. 7, air around the golf ball model 1 using stream lines, path lines, particle traces or volume rendering of the air.

The simulation method of the present invention, instead of carrying out testing and evaluation with actual physical prototypes, such as in a wind tunnel test, is able to analyze the air flow around a golf ball which rotates while in flight and calculate the coefficient of lift and the coefficient of drag for the golf ball, making it possible for golf ball performance to be evaluated in this way. Moreover, the invention effectively shortens the time it takes to analyze air flow around the golf ball, enabling accurate coefficients of lift and drag to be calculated in a short time, and thus making it feasible to carry out evaluations of golf ball performance by computer simulation.

EXAMPLES

The following Examples and Comparative Examples are provided by way of illustration and not by way of limitation.

Examples 1 to 5, and Comparative Examples 1 and 2

The coefficient of lift CL and the coefficient of drag CD were calculated under the conditions in Table 1 below in accordance with methods of analysis (A) and (B) shown in FIG. 1 for two golf ball models (Model 1, Model 2) having different dimple designs, and the performances of both golf ball models were comparatively evaluated. The precision of the coefficient of lift CL and coefficient of drag CD estimates obtained in each simulation and the respective computational times were rated according to the criteria shown below. Specifications for the computers used in the simulations were as follows.

Computer Specifications
    Operating System: Windows XP
    CPU: Intel Xeon X5482 (3.20 GHz, L2 cache=6 MB×2, FSB speed=1600 MHz, 2 CPU/8 Core)
    Memory: 64 GB (4096 MB×16), DDR2-800, ECC, REG, FB-DIMM Criteria for Rating Precision of CD and CL Estimates
    Exc: Comparative evaluation could be carried out with stable values.
    Good: Comparative evaluation could be adequately carried out.
    Fair: Comparative evaluation was possible.
    NG: Comparative evaluation was impossible.

Computational Time
    Exc: 30 hours or less
    Good: 60 hours or less
    Fair: 90 hours or less
    NG: More than 90 hours

TABLE 1

|  | Example | | | | | Comparative Example | |
| --- | --- | --- | --- | --- | --- | --- | --- |
|  | 1 | 2 | 3 | 4 | 5 | 1 | 2 |
| Analytical method | (B) | (B) | (B) | (B) | (B) | (A) | (B) |
| Grid shape | polygon mesh | polygon mesh | polygon mesh | polygon mesh | polygon mesh | polygon mesh | polygon mesh |
| Air stream velocity V (m/s) | 70 | 70 | 70 | 70 | 70 | 70 | 70 |
| Ball spin rate (rpm) | 3,000 | 3,000 | 3,000 | 3,000 | 3,000 | 3,000 | 3,000 |
| Hours of analytical computation | 6 | 12 | 36 | 60 | 85 | 240 | 3 |
| Length X of virtual airflow space in direction of flow by air stream (m) | 10 | 10 | 10 | 10 | 10 | 10 | 10 |
| Airflow stabilization time T (s) | 0.3 | 0.3 | 0.3 | 0.3 | 0.3 | — | 0.3 |
| (V × T)/X | 2.1 | 2.1 | 2.1 | 2.1 | 2.1 | — | 2.1 |
| Number of rotations during period of analysis | ½ | 1 | 3 | 5 | 7 | 5 | ¼ |
| Model 1   CD | 0.285 | 0.283 | 0.285 | 0.284 | 0.288 | 0.283 | 0.155 |
| CL | 0.127 | 0.129 | 0.135 | 0.138 | 0.138 | 0.135 | 0.065 |
| Model 2   CD | 0.274 | 0.274 | 0.273 | 0.273 | 0.276 | 0.273 | 0.103 |
| CL | 0.123 | 0.113 | 0.118 | 0.122 | 0.123 | 0.121 | 0.082 |
| CD and CL Estimates | Fair | Good | Exc | Exc | Exc | Exc | NG |
| Computational time | Exc | Exc | Good | Good | Fair | NG | Exc |

As is apparent from Table 1, accurate performance evaluations of golf balls can be carried out in a short period of time by the performance evaluations in Examples 1 to 5, which were carried out according to the simulation method of the invention shown in flow chart (B) of FIG. 1. By contrast, the performance evaluation in Comparative Example 1, which was carried out according to the conventional simulation method shown in flow chart (A) of FIG. 1, took 240 hours, which is a long time. In Example 4, which, aside from the method of analysis, was carried out under the same conditions as in Comparative Example 1, analysis was carried out to the same level of precision in 60 hours, or just one-fourth the time. Hence, the time shortening effect of this invention is remarkable. In Comparative Example 2, which calculated the CD and CL values in the course of a one-quarter turn by the golf ball model, stable and accurate CL and CL values could not be obtained because the amount of ball rotation was insufficient. For instance, contrary to the other examples, the CL value here was larger in Model 2 than in Model 1. It was thus impossible in Comparative Example 2 to comparatively evaluate the performances of both ball models.

The invention claimed is:

1. A simulation method for evaluating the performance of a golf ball having on a surface thereof at least one depression or protrusion by analyzing air flow around the ball when the ball rotates while in flight, the method comprising the steps of:

(A) setting up, within a virtual space created in a computer, a golf ball model and a virtual airflow space which surrounds a periphery of the golf ball model;

(B) generating a grid in the virtual airflow space and configuring the grid so as to be finer near a surface of the golf ball model and to gradually increase in size in a direction leading away from the surface;

(C) establishing a state where an air stream of a given velocity flows into the virtual airflow space from in front of the golf ball model;

(D) setting an airflow stabilization time during which computation proceeds until the air stream flowing into the virtual airflow space ceases to be affected by initial air flow and stabilizes;

(E) rotating the golf ball model at a given spin rate once the airflow stabilization time has elapsed;

(F) calculating for each cell of the grid a velocity, a direction and a pressure of the air stream which flows within the virtual space from in front of the golf ball model, passes around the ball model and flows on behind while the model rotates through at least one-half turn after the airflow stabilization time has elapsed; and (G) integrating the air stream velocity, direction and pressure calculated for each individual grid cell, and calculating a coefficient of lift and a coefficient of drag for the golf ball model in the virtual airflow space.

2. The simulation method for golf ball evaluation of claim 1, wherein the airflow stabilization time is set in such a way as to satisfy the expression $$1 \leq (V \times T)/X \leq 20$$

(where V is the air stream velocity (m/s), T is the airflow stabilization time (s), and X is the length (m) of the virtual airflow space in the direction of flow by the air stream).

3. The simulation method for golf ball evaluation of claim 1, wherein the grid generated in the virtual airflow space is in the form of a tetra mesh.

4. The simulation method for golf ball evaluation of claim 1, wherein the grid generated in the virtual airflow space is in the form of a polygon mesh.

5. A simulation method for golf ball evaluation, comprising the step of, based on the results of simulation in claim 1, visualizing the direction and velocity of air flow around the golf ball model using vector directions and lengths.

6. A simulation method for golf ball evaluation, comprising the step of, based on the results of simulation in claim 1, visualizing the distribution of air pressure around the golf ball model using isobaric lines or isobaric surfaces.

7. A simulation method for golf ball evaluation, comprising the step of, based on the results of simulation in claim 1, visualizing the vorticity distribution of air around the golf ball model using vorticity contours or isosurfaces.

8. A simulation method for golf ball evaluation, comprising the step of, based on the results of simulation in claim 1, visualizing air around the golf ball model using stream lines, path lines, particle traces or volume rendering of the air.

* * * * *